No. 778,830. PATENTED DEC. 27, 1904.
O. S. MARTIN.
APPARATUS FOR TOPPING BEETS.
APPLICATION FILED JULY 16, 1903.

Witnesses.
G. J. Colbourne
L. J. Mills.

Inventor.
Osgood S. Martin
by Ridout & Maybee
Attys

No. 778,830.
Patented December 27, 1904.

UNITED STATES PATENT OFFICE.

OSGOOD SIMPSON MARTIN, OF GORE OF CHATHAM TOWNSHIP, ONTARIO, CANADA.

APPARATUS FOR TOPPING BEETS.

SPECIFICATION forming part of Letters Patent No. 778,830, dated December 27, 1904.

Application filed July 16, 1903. Serial No. 165,857.

*To all whom it may concern:*

Be it known that I, OSGOOD SIMPSON MARTIN, farmer, of the township of Gore of Chatham, in the county of Kent, in the Province of Ontario, Canada, have invented certain new and useful Improvements in Apparatus for Topping Beets, of which the following is a specification.

The object of my invention is to provide a device for cutting off the tops of beets before the beets have been raised from the ground and which is capable of attachment to the frame of any of the ordinary horse-drawn beet-lifters, and is especially designed for the topping of sugar-beets in the manner required for their use in the manufacture of sugar, although suitable for removing the tops from other classes of vegetables.

I make no claim for any improvements in beet-lifters, although my device is especially designed for attachment to such class of machine, for it is obvious that when my device is mounted on any suitable frame it is capable of doing the work for which it is adapted without lifting the beet from the ground; and it consists, essentially, in so suspending from a suitable frame a pair of rotatable cutting-disks as to permit of a slight undulating motion of the cutting edges, so that they may be readily caused to come in contact with the tops of each of a series of beets in a row, notwithstanding rocking of the machine or variations in the surface on which the tops may be situated.

Figure 1:
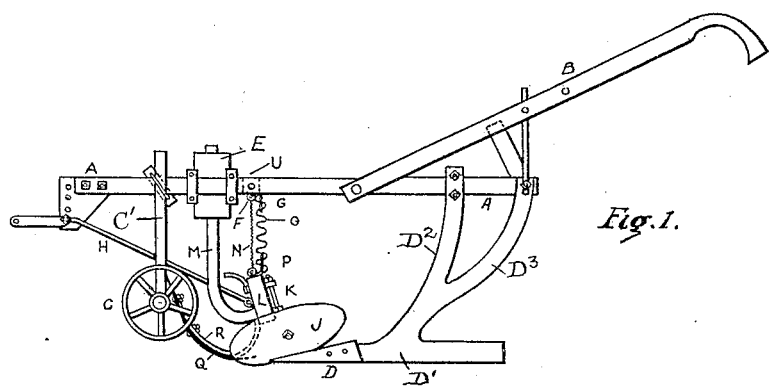
Figure 2:
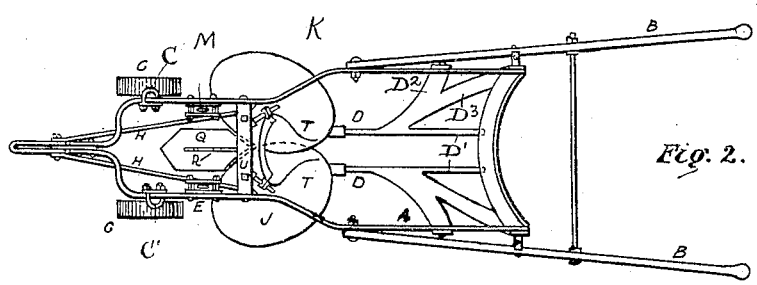
Figure 3:
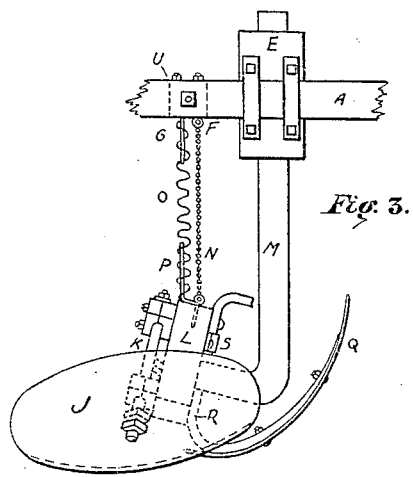
Figure 4:
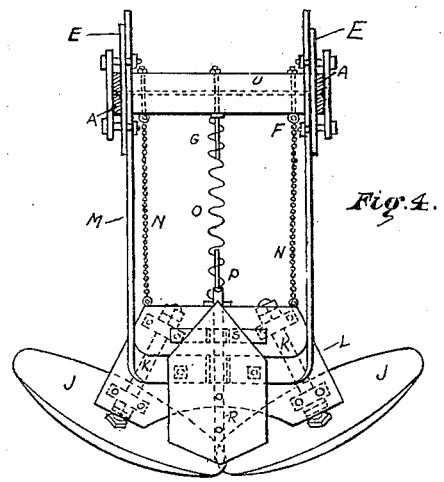

Figure 1 is a side elevation showing my beet-topping device in place on a beet-lifter of ordinary construction. Fig. 2 is a plan view of the same. Fig. 3 is a side view of my beet-topping device, showing the mode of attachment to the frame, the diagonal braces H H shown in Figs. 1 and 2 being omitted. Fig. 4 is a front view of my beet-topping device, showing its mode of suspension from the cross-brace U of the frame, the cant given to the cutting-disks, and the mode in which the cutting edges of the disk which come in contact with the beet overlap each other.

In the drawings like letters of reference indicate corresponding parts in the different figures.

It will be noticed that my device is located in front of the lifters D, which lift the beet from the ground, so that the tops may be cut before the beets are moved.

A shows an iron framing of a lifter, preferably of the shape shown in plan view, Fig. 2.

B B are handles for operating the device.

C C are two wheels located in the forward end of the lifter, journaled on struts C', which are adjustably connected with the frame A, so as to adjust the height of the wheels as may be desired. It will be noticed in Fig. 1 that when the lifting device is not in use it rests on the ground on the base-pieces D' and the wheels C are raised above the surface of the ground. When being operated, the rear end of the machine is raised from the ground, so that the wheels C may rest thereon. This causes the iron lifters D (shown in Figs. 1 and 2) to plow into the ground on each side of the row of beets to be lifted.

The base-pieces D' are connected to or form parts of the inwardly-curved legs $D^2 D^3$, (shown in Fig. 2,) which latter are bolted to the frame A of the machine.

In Figs. 1 and 2 are shown the means whereby the frame-piece L, to which my cutting device is journaled, is kept in place by the diagonal braces H, which connect the forward part of the machine and the frame-piece together, so as to prevent my device from being drawn backward when in operation.

Figs. 3 and 4 show my invention drawn to a larger scale than the other views. In these enlarged detail views a portion only of the main frame A of the machine is shown.

U is a cross-brace from which my device is suspended.

E represents guide-pieces so located on the main frame A as to permit of the cutting edges of my rotary disk being in front of the lifters D. The vertical guide-bars M M pass up freely through these guides E E. These guide-bars preferably form an integral U-shaped piece, as indicated in Fig. 4, in which the base of the U is so shaped as to permit of attachment thereto of the frame-piece L, so as to give this frame-piece a forward tilt at its upward side.

The frame-piece L, which carries my cutting device, is suspended from the cross-brace U by means of the chains N N, which are adjustable in length, so as to regulate the height of the frame-piece L above the ground. Between these chains N N is located the expansive coil-spring O, which bears against the bottom of the cross-brace U, and its upper end is held in place by means of the bolt G. The lower end of this expansive coil-spring bears against the upper part of the frame-piece L and is held in place by the bolt P, which is rigidly attached to the top of the frame-piece L. Instead of having this exact construction it might be deemed advisable to have the rod P continued upward and through the cross-brace U, with an adjusting-pin above the cross-brace U, so as to limit the downward throw of the spring in the usual manner.

It will be noticed that J J are cutting-disks with concave faces upward. It will be noticed that these cutting-disks, which are designed to cut the tops off the beets, have a peculiar set given to them. They are firmly attached in the usual manner to spindles K K, which spindles are journaled on the frame-piece L in the manner indicated and move freely in their journals. These spindles have their upward ends inwardly inclined toward each other, while they also have a forward cant, as indicated. This gives a peculiar set and scooping action to the concave disks J. It will be noticed that the lowermost cutting edges of the disks J overlap each other, as indicated in Fig. 4, so as to make a complete cut of the top of the beet.

Q is a runner, the shape of which is indicated in Figs. 3 and 4. This runner is securely bolted to the curved iron rod R, which is held in place on the frame-piece L by means of the strap S and bolt attached to the base of the vertical guide-bars M M. The lower end of this runner is preferably prolonged behind the bars indicated in Fig. 3. It will be noticed that the upward bend of this bar R is situated near the ground immediately in front of the cutting edges of the disks and is raised slightly above them. The runner Q is securely bolted to the bent rod R, as indicated in Fig. 3, and is shaped somewhat like the forward end of a sleigh-runner. This runner is designed to raise or lower the machine, according to the unevenness of the beets before they are cut, and is held down to its work by the weight of my device, as well as by the expansive action of the expansive spring O, already referred to.

It will thus be seen that my beet-topping device is adjustably connected to the main frame A and held in operative position by means of the diagonal braces H, the chains N, the expansive coil-spring O, and the vertical guide-bars M, working freely through the guides E, formed on the frame.

The concave cutting-disks J have sharp cutting edges, and when the lower cutting edge comes in contact with the top of a beet it enters the beet and the beet passes between the disks in such a manner as to cause the disks to have a rotating motion, as they are rigidly attached to the spindles K, which are secured on their journals by jam-nuts and move freely on their journals. The runner Q and the frame-piece L may be raised or lowered, according as it may be required to cut less or more from the tops of the beets. It will also be noticed that the rear end of the runner Q projects backward to a point where the cutting edges of the disks intersect, and thus in operation keep the disks at the required distance below the tops of the beets until they are cut.

T (shown in Fig. 2) is a stiff wire fastened to the back of the frame-piece L, with its ends bent backward over the disks, so as to sweep the tops of the beets off the disks after being cut.

What I claim as my invention is—

1. In an apparatus for topping beets the combination with the main frame of guides; vertical guide-bars; a frame-piece; adjustable chains suspending the frame-piece from the main frame; an expansive coil-spring between the main frame and the frame-piece; diagonal brace-rods; spindles journaled on the frame-piece; and rotatable cutting-disks attached to the spindles, substantially as described.

2. In an apparatus for topping beets the combination with the main frame of guides; vertical guide-bars adapted to move freely in a vertical direction through the guides; a frame-piece secured to the guide-bars with a forward cant to its upper end; adjustable chains suspending the frame-piece from the main frame; an expansive coil-spring between the main frame and the frame-piece; diagonal brace-rods; spindles journaled on the slanting frame-piece with their upper ends inclined toward each other; and rotatable cutting-disks attached to the spindles, substantially as described.

3. In an apparatus for topping beets the combination with the main frame of guides; vertical guide-bars adapted to move freely in a vertical direction through the guides; a frame-piece secured to the guide-bars with a forward cant to its upper end; adjustable chains suspending the frame-piece from the main frame; an expansive coil-spring between the main frame and the frame-piece; diagonal brace-rods between the frame-piece and forward part of the main frame; spindles journaled on the slanting frame-piece with their upper ends inclined toward each other; rotatable cutting-disks with concave face upward, attached to the spindles; and a runner located in front of the overlapping cutting edges of the disks and securely fastened centrally to the adjustable frame-piece, substantially as described.

4. In an apparatus for topping beets the combination with the main frame of guides; vertical guide-bars adapted to move freely in a vertical direction through the guides; a frame-piece secured to the guide-bars with a forward cant to the upper end; adjustable chains suspending the frame-piece from the main frame; an expansive coil-spring held in place between the chains and bearing against the main frame and frame-piece; diagonal brace-rods between the frame-piece and forward part of the main frame; spindles journaled on the slanting frame-piece with their upper ends inclined toward each other; rotatable cutting-disks with concave face upward, attached to the spindles; an adjustable runner located in front of the overlapping cutting edges of the disks with end projecting rearward over these edges, and securely fastened centrally to the frame-piece; and a bent stiff wire secured to the back of the frame-piece with a free end bent backward over each disk to remove the cut tops therefrom, substantially as described.

Dresden, Ontario, July 11, 1903.

OSGOOD SIMPSON MARTIN.

In presence of—
T. D. QUIGLEY,
ALVAH MARTIN.